US008990520B1

(12) United States Patent
Tang et al.

(10) Patent No.: US 8,990,520 B1
(45) Date of Patent: Mar. 24, 2015

(54) GLOBAL MEMORY AS NON-VOLATILE RANDOM ACCESS MEMORY FOR GUEST OPERATING SYSTEMS

(75) Inventors: Hongliang Tang, Hopkinton, MA (US); Lixin Pang, Franklin, MA (US); Matthew H. Fredette, Belmont, MA (US); Patrick Brian Riordan, West Newton, MA (US); Uresh Vahalia, Newton, MA (US); Steven T. McClure, Northboro, MA (US)

(73) Assignee: EMC Corporation, Hopkinton, MA (US)

(*) Notice: Subject to any disclaimer, the term of this patent is extended or adjusted under 35 U.S.C. 154(b) by 0 days.

(21) Appl. No.: 13/435,328

(22) Filed: Mar. 30, 2012

(51) Int. Cl.
  *G06F 12/00* (2006.01)
  *G06F 12/10* (2006.01)

(52) U.S. Cl.
  CPC .................................. *G06F 12/1072* (2013.01)
  USPC ........................................................ 711/154

(58) Field of Classification Search
  USPC .................................................. 711/103, 154
  See application file for complete search history.

(56) References Cited

U.S. PATENT DOCUMENTS

| | | | |
|---|---|---|---|
| 5,206,939 A | 4/1993 | Yanai et al. | |
| 5,778,394 A | 7/1998 | Galtzur et al. | |
| 5,845,147 A | 12/1998 | Vishlitzky et al. | |
| 5,857,208 A | 1/1999 | Ofek | |
| 6,567,897 B2* | 5/2003 | Lee et al. | 711/153 |
| 7,558,926 B1 | 7/2009 | Oliveira et al. | |
| 7,599,951 B1 | 10/2009 | Oliveira et al. | |
| 7,665,088 B1 | 2/2010 | Bugnion et al. | |
| 7,743,389 B2 | 6/2010 | Mahalingam et al. | |
| 7,937,367 B2* | 5/2011 | Watanabe et al. | 707/640 |
| 7,945,436 B2 | 5/2011 | Ang et al. | |
| 8,473,777 B1* | 6/2013 | Rangachari et al. | 714/6.12 |
| 2006/0136667 A1* | 6/2006 | Shultz et al. | 711/118 |
| 2007/0186212 A1* | 8/2007 | Mazzaferri et al. | 718/1 |
| 2009/0094603 A1* | 4/2009 | Hiltgen et al. | 718/1 |
| 2010/0251006 A1* | 9/2010 | Goodson et al. | 714/3 |
| 2011/0271062 A1* | 11/2011 | Chen | 711/154 |
| 2012/0011340 A1* | 1/2012 | Flynn et al. | 711/171 |

OTHER PUBLICATIONS

EMC Corporation, "Enginuity: The EMC Symmetrix Storage Operating Environment: A Detailed Review," White paper C1033, Oct. 2010, 28 pp.
U.S. Appl. No. 13/249,422, filed Sep. 30, 2011, Chalmer et al.
U.S. Appl. No. 13/200,777, filed Sep. 30, 2011, Chalmer et al.

* cited by examiner

*Primary Examiner* — Aimee Li
*Assistant Examiner* — Trang Ta
(74) *Attorney, Agent, or Firm* — Muirhead and Saturnelli, LLC

(57) ABSTRACT

Global memory of a storage system may be used to provide NVRAM capabilities to guest operating systems accessing the storage system. The non-volatility of NVRAM (i.e. that retains its information when power is turned off) provides that an NVRAM device provided by global memory may be used as a journaling device to track storage operations and facilitate recovery and/or failover processing in a storage system without needing to add additional hardware and/or other installed devices. Use of the global memory according to the system described herein to provide an NVRAM device, that may function as a journaling device, provides for the speeding up of transactions, thereby improving metadata intensive operations performance and reducing recovery time and/or failover time of a storage system without adding additional hardware support.

18 Claims, 12 Drawing Sheets

GLOBAL MEMORY AS NON-VOLATILE RANDOM ACCESS MEMORY FOR GUEST OPERATING SYSTEMS

TECHNICAL FIELD

This application is related to the field of virtualized computing environments and, more particularly, the use of global memory as non-volatile random access memory (NVRAM) for a guest operating system (Guest OS).

BACKGROUND OF THE INVENTION

Host processor systems may store and retrieve data using a storage device containing a plurality of host interface units (I/O modules), disk drives, and disk interface units (disk adapters). Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek, which are incorporated herein by reference. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

A hypervisor is a software implementation that may provide a software virtualization environment in which other software may run with the appearance of having full access to the underlying system hardware, but in which such access is actually under the complete control of the hypervisor. The software running in such a hypervisor managed environment may execute within a virtual machine (VM) and multiple VMs may be managed simultaneously by a hypervisor. Hypervisors may generally be classed as type 1 or type 2, depending on whether the hypervisor is running in a supervisor mode on "bare metal" (type 1) or is itself hosted by an operating system (OS) (type 2). A bare metal environment describes a computer system in which a VM is installed directly on hardware rather than within a host OS. ESX and ESXi, produced by VMware, Inc. of Palo Alto, Calif., are examples of bare-metal hypervisors that may run directly on server hardware without requiring an additional underlying operating system. For discussions of the use of known hypervisors (or "virtual machine monitors") in virtualized computing environments, see, for example, U.S. Pat. No. 7,665,088 to Bugnion et al., entitled "Context-Switching to and from a Host OS in a Virtualized Computer System"; U.S. Pat. No. 7,743,389 to Mahalingam et al., entitled "Selecting Between Pass-Through and Emulation in a Virtual Machine Environment"; and U.S. Pat. No. 7,945,436 to Ang et al., entitled "Pass-Through and Emulation in a Virtual Machine Environment", which are all assigned to VMware, Inc. and which are all incorporated herein by reference. Although the term "hypervisor" is principally used herein, this term should be understood herein to refer to any appropriate software layer having the described features and functions discussed herein.

Techniques are known in storage systems to provide failover capability and recovery operations that involve use of journaling devices that are used to track and log storage operations. Reference is made, for example, to U.S. Pat. No. 7,558,926 to Oliveira et al., entitled "Continuous Data Backup Using Distributed Journaling" and U.S. Pat. No. 7,599,951 to Oliveira et al., entitled "Continuous Data Backup," which are both assigned to EMC Corporation of Hopkinton, Mass. and are both incorporated herein by reference, and which disclose various techniques for providing continuous storage backup of storage data using journaling devices. In some circumstances, it is noted that the journaling devices may act as performance bottlenecks and that recovering from failures using such journaling devices may, in some situations, take significant amounts of time. Additionally, the use of additional hardware and/or other installed devices to support journaling processing to support failover and recovery capability may result in additional costs.

Accordingly, it would be desirable to provide a system and techniques for enabling efficient use of resources in connection with journaling, failover and recovery capabilities, particularly in connection with storage systems.

SUMMARY OF THE INVENTION

According to the system described herein, a method for using global memory of a distributed system to provide non-volatile memory random access memory (NVRAM) capabilities includes identifying the global memory of the distributed system. Access by a guest operating system is provided to the global memory. The global memory accessed by the guest operating system is used as NVRAM. Operations of the guest operating system are performed using the NVRAM provided by the global memory. The distributed system may be a storage system and the operations may be journaling operations that include recovery or failover processing. The providing of access by the guest operating system to the global memory may include loading the guest operating system using a hypervisor and controlling access of the guest operating system to the storage system according to the hypervisor. The global memory acting as NVRAM may be distributed across a plurality of storage devices and processing resources accessing the global memory acting as NVRAM may be distributed across the plurality of storage devices.

According further to the system described herein, a non-transitory computer readable medium stores software for using global memory of a distributed system to provide non-volatile memory random access memory (NVRAM) capabilities. The software includes executable code that identifies the global memory of the distributed system. Executable code is provided that provides access by a guest operating system to the global memory. Executable code is provided that uses the global memory accessed by the guest operating system as NVRAM. Executable code is provided that performs operations of the guest operating system using the NVRAM provided by the global memory. The distributed system may be a storage system and the operations may be journaling operations that include recovery or failover processing. The executable code that provides access by the guest operating system to the global memory may include executable code that loads the guest operating system using a hypervisor and controlling access of the guest operating system to the storage system according to the hypervisor. The global memory acting as NVRAM may be distributed across a plurality of storage devices and processing resources accessing the global memory acting as NVRAM may be distributed across the plurality of storage devices.

According further to the system described herein, a storage system having global memory used to provide non-volatile memory random access memory (NVRAM) capabilities includes at least one processor providing processing resources for the distributed system and a computer-readable medium storing software executable by the at least one processor. The software includes executable code that identifies the global memory of the distributed system. Executable code is provided that provides access by a guest operating system to the global memory. Executable code is provided that uses the global memory accessed by the guest operating system as NVRAM. Executable code is provided that performs operations of the guest operating system using the NVRAM provided by the global memory. The operations may be journaling operations that include recovery or failover processing. The executable code that provides access by the guest operating system to the global memory may include executable code that loads the guest operating system using a hypervisor and controlling access of the guest operating system to the storage system according to the hypervisor. The global memory acting as NVRAM may be distributed across a plurality of storage devices and processing resources accessing the global memory acting as NVRAM may be distributed across the plurality of storage devices.

BRIEF DESCRIPTION OF THE DRAWINGS

Embodiments of the system described herein are explained with reference to the several figures of the drawings, which are briefly described as follows.

DETAILED DESCRIPTION OF VARIOUS EMBODIMENTS

Figure 1:
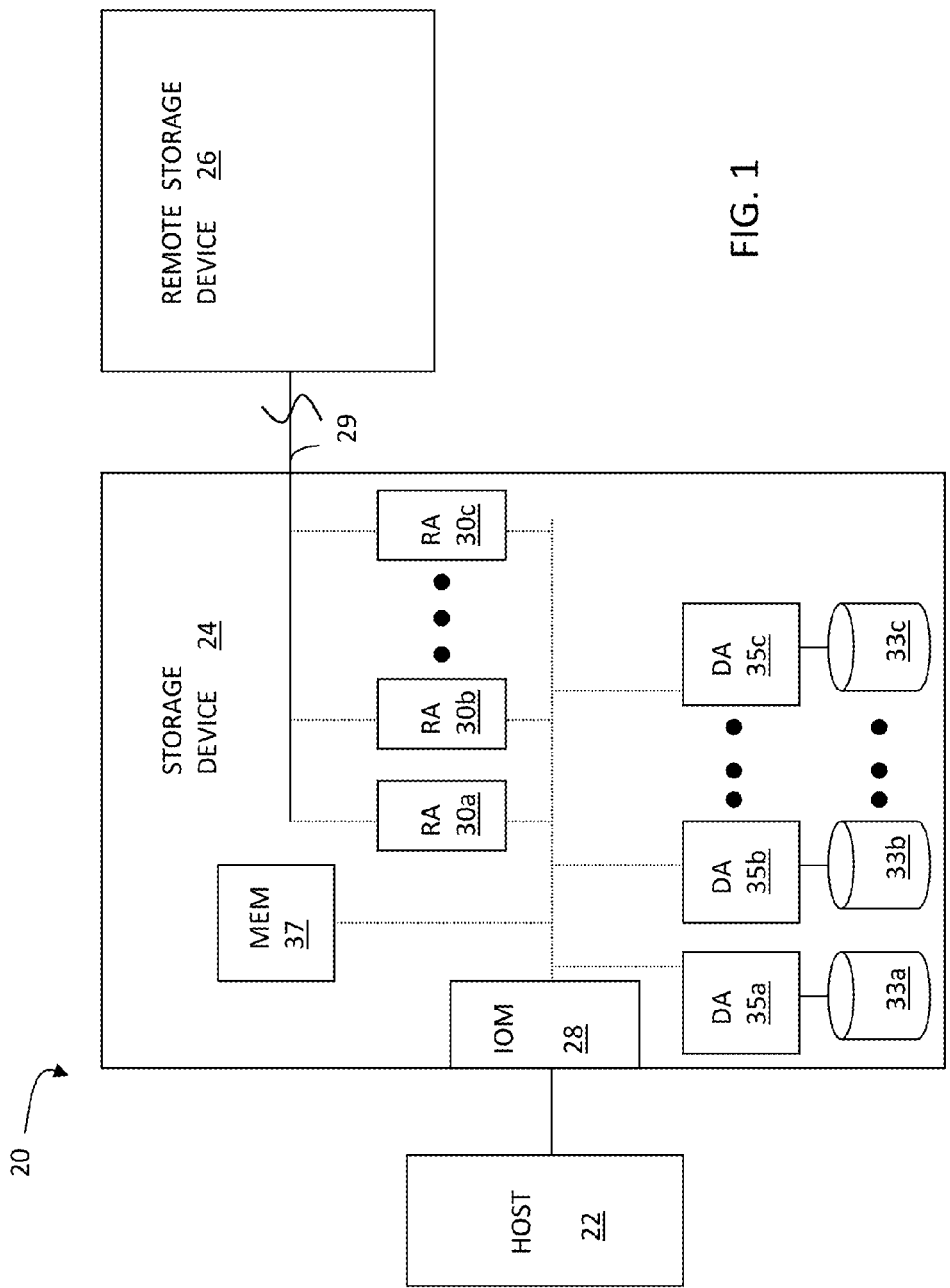
FIG. 1 is a schematic illustration of a storage system showing a relationship between a host and a storage device that may be used in connection with an embodiment of the system described herein.

FIG. 1 is a schematic illustration of a storage system 20 showing a relationship between a host 22 and a storage device 24 that may be used in connection with an embodiment of the system described herein. In an embodiment, the storage device 24 may be a Symmetrix storage device produced by EMC Corporation of Hopkinton, Mass. Also illustrated is another (remote) storage device 26 that may be similar to, or different from, the storage device 24 and may, in various embodiments, be coupled to the storage device 24, for example, via a network. The host 22 reads and writes data from and to the storage device 24 via an I/O module (IOM) 28, which facilitates the interface between the host 22 and the storage device 24. Although the diagram 20 only shows one host 22 and one IOM 28, it will be appreciated by one of ordinary skill in the art that multiple IOMs may be used and that one or more IOMs may have one or more hosts coupled thereto.

In an embodiment of the system described herein, data from the storage device 24 may be copied to the remote storage device 26 via a link 29. For example, the transfer of data may be part of a data mirroring or replication process, that causes the data on the remote storage device 26 to be identical to the data on the storage device 24. Although only the one link 29 is shown, it is possible to have additional links between the storage devices 24, 26 and to have links between one or both of the storage devices 24, 26 and other storage devices (not shown). The link 29 may, in various embodiments, be a direct link and/or a network link, such as a network connection provided over the Internet and/or over an area network. The storage device 24 may include a first plurality of adapter units (RAs) 30a, 30b, 30c. The RAs 30a-30c may be coupled to the link 29 and be similar to the I/O Module (IOM) 28, but are used to transfer data between the storage devices 24, 26.

The storage device 24 may include one or more disks, each containing a different portion of data stored on each of the storage device 24. FIG. 1 shows the storage device 24 including a plurality of disks 33a, 33b, 33c. The storage device (and/or remote storage device 26) may be provided as a stand-alone device coupled to the host 22 as shown in FIG. 1 or, alternatively, the storage device 24 (and/or remote storage device 26) may be part of a storage area network (SAN) that includes a plurality of other storage devices as well as routers, network connections, etc. The storage devices may be coupled to a SAN fabric and/or be part of a SAN fabric. The system described herein may be implemented using software, hardware, and/or a combination of software and hardware where software may be stored in a computer readable medium and executed by one or more processors.

Each of the disks 33a-33c may be coupled to a corresponding disk adapter unit (DA) 35a, 35b, 35c that provides data to a corresponding one of the disks 33a-33c and receives data from a corresponding one of the disks 33a-33c. An internal data path exists between the DAs 35a-35c, the IOM 28 and the RAs 30a-30c of the storage device 24. Note that, in other embodiments, it is possible for more than one disk to be serviced by a DA and that it is possible for more than one DA to service a disk. The storage device 24 may also include a global memory 37 that may be used to facilitate data transferred between the DAs 35a-35c, the IOM 28 and the RAs 30a-30c. The memory 37 may contain tasks that are to be performed by one or more of the DAs 35a-35c, the IOM 28 and the RAs 30a-30c, and a cache for data fetched from one or more of the disks 33a-33c.

The storage space in the storage device 24 that corresponds to the disks 33a-33c may be subdivided into a plurality of volumes or logical devices. The logical devices may or may not correspond to the physical storage space of the disks 33a-33c. Thus, for example, the disk 33a may contain a plurality of logical devices or, alternatively, a single logical device could span both of the disks 33a, 33b. Similarly, the storage space for the remote storage device 26 that may comprise disks like that of the disks 33a-33c may be subdivided into a plurality of volumes or logical devices, where each of the logical devices may or may not correspond to one or more of the disks.

Figure 2:
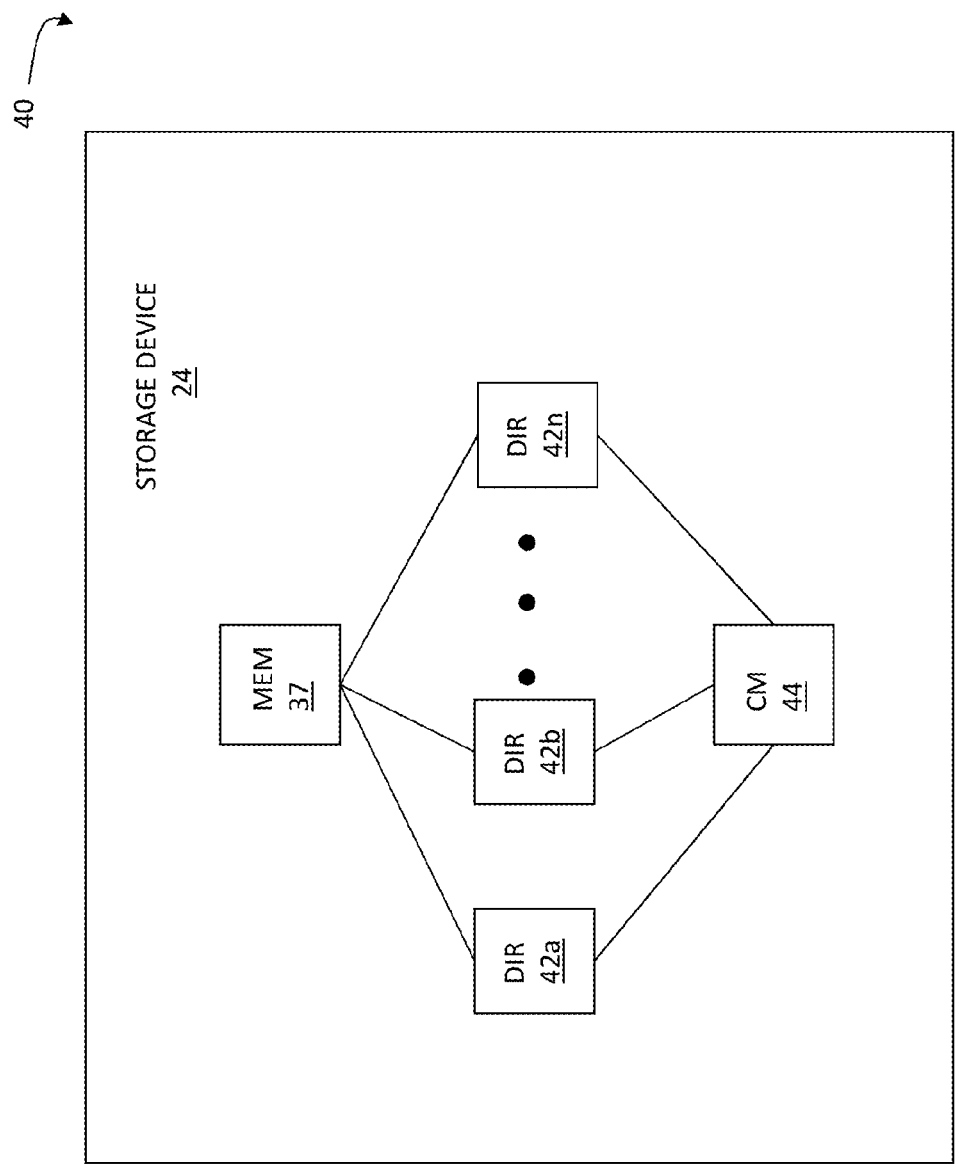
FIG. 2 is a schematic diagram illustrating an embodiment of the storage device where each of a plurality of directors are coupled to the memory.

FIG. 2 is a schematic diagram 40 illustrating an embodiment of the storage device 24 where each of a plurality of directors 42a-42n are coupled to the memory 37. Each of the directors 42a-42n represents at least one of the IOM 28, RAs 30a-30c, or DAs 35a-35c. The diagram 40 also shows an optional communication module (CM) 44 that provides an alternative communication path between the directors 42a-42n. Each of the directors 42a-42n may be coupled to the CM 44 so that any one of the directors 42a-42n may send a message and/or data to any other one of the directors 42a-42n without needing to go through the memory 37. The CM 44 may be implemented using conventional MUX/router technology where a sending one of the directors 42a-42n provides an appropriate address to cause a message and/or data to be received by an intended receiving one of the directors 42a-42n. Some or all of the functionality of the CM 44 may be implemented using one or more of the directors 42a-42n so that, for example, the directors 42a-42n may be interconnected directly with the interconnection functionality being provided on each of the directors 42a-42n. In addition, a sending one of the directors 42a-42n may be able to broadcast a message to all of the other directors 42a-42n at the same time.

In some embodiments, one or more of the directors 42a-42n may have multiple processor systems thereon and thus may be able to perform functions for multiple directors. In some embodiments, at least one of the directors 42a-42n having multiple processor systems thereon may simultaneously perform the functions of at least two different types of directors (e.g., an IOM and a DA). Furthermore, in some embodiments, at least one of the directors 42a-42n having multiple processor systems thereon may simultaneously perform the functions of at least one type of director and perform other processing with the other processing system. In addition, all or at least part of the global memory 37 may be provided on one or more of the directors 42a-42n and shared with other ones of the directors 42a-42n. In an embodiment, the features discussed in connection with the storage device 24 may be provided as one or more director boards having CPUs, memory (e.g., DRAM, etc.) and interfaces with I/O modules, and in which multiple director boards may be networked together via a communications network, such as, for example, an internal Ethernet communications network, a serial rapid I/O (SRIO) fabric and/or Infiniband fabric (v3).

Figure 3:
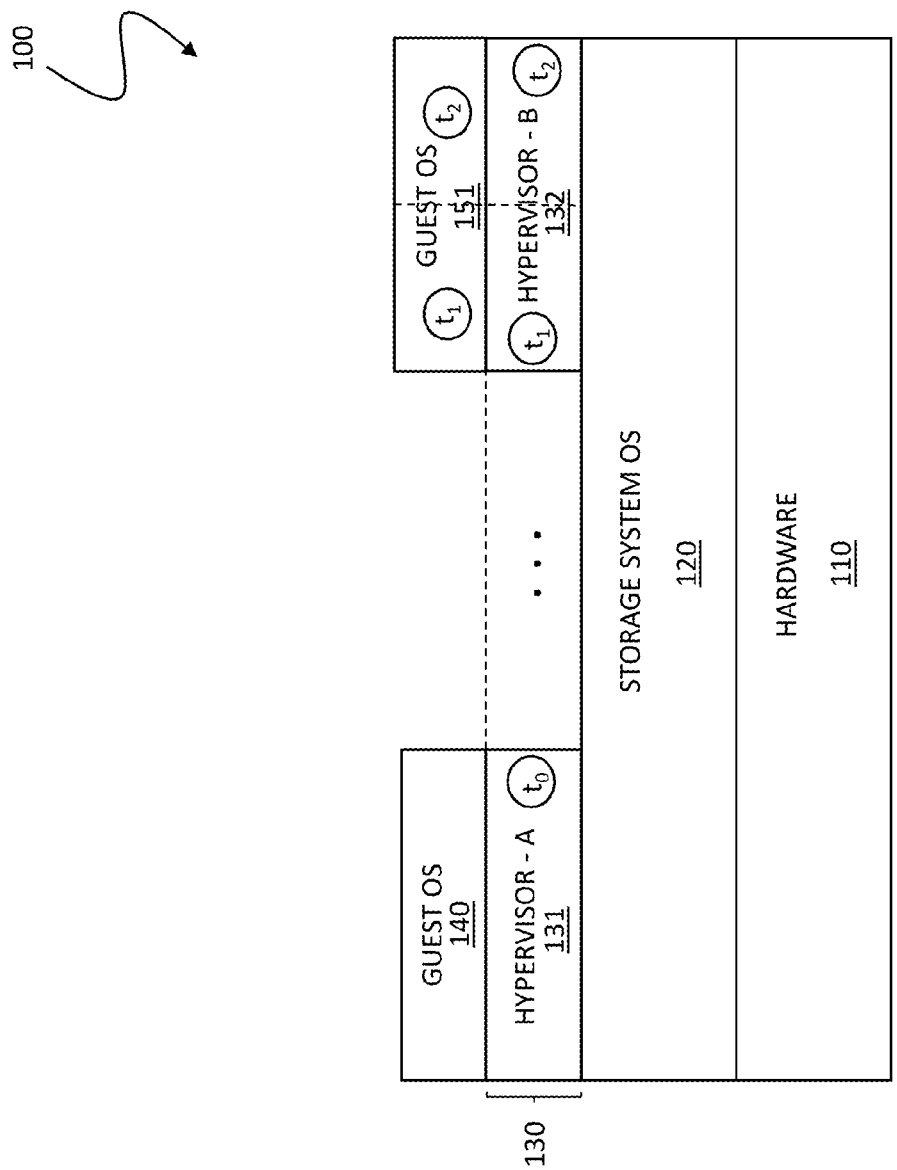
FIG. 3 is a schematic illustration showing hardware and software layers for a storage system, including independent hypervisors as threads, that may be used in connection with an embodiment of the system described herein.

FIG. 3 is a schematic illustration showing hardware and software layers for a storage system 100, including independent hypervisors as threads, that may be used in connection with an embodiment of the system described herein. In an embodiment, the storage system 100 may be a Symmetrix storage system produced by EMC Corporation of Hopkinton, Mass. A hardware layer 110 includes hardware components for the storage system 100, such as storage devices with memory and processors (CPUs) and/or other components like that discussed in connection with the storage devices of FIGS. 1 and 2, and may be distributed across multiple devices and locations. A storage system operating system (OS) layer 120 is shown as the operating system for the storage system 100. In an embodiment, the OS layer 120 may be a Symmetrix storage system OS, such as Enginuity, with a Symm/K kernel that provides OS services and scheduling. Other operating systems may be used, such as the Linux operating system.

An instance is a single binary image of the OS that performs a specific set of operations. In an embodiment, there may be up to eight instances configured on a director board at any given time. A thread is a separately schedulable set of code or process of an instance. Threads may be co-operative and/or preemptive, and may be scheduled by the OS. An instance may run on more than one core, that is, an instance may provide a symmetric multiprocessing (SMP) environment to threads running within the instance.

A thread may be provided that runs as a hypervisor within the storage system OS environment. As previously discussed, a hypervisor is a software implementation providing a software virtualization environment in which other software may run with the appearance of having full access to the underlying system hardware, but in which such access is actually under the complete control of the hypervisor. The hypervisor running as the OS thread may be called a container hypervisor. The container hypervisor may manage a virtual hardware environment for a guest operating system (Guest OS), and, in an embodiment, the container hypervisor may run multiple OS threads (e.g., 1 to N threads) within a single instance. The Guest OS is an operating system that may be loaded by a thread of the container hypervisor, and runs in the virtual environment provided by the container hypervisor. The Guest OS may also access real hardware devices attached to a director board using a virtual device provided by the container hypervisor or via a peripheral component interconnect (PCI) pass-through device/driver. There may be multiple container hypervisors running within a single instance at the same time. There may also be multiple container hypervisors running within different instances on the same director board at the same time.

In FIG. 3, a hypervisor layer 130 is shown as including hypervisor-A 131 and hypervisor-B 132 that may be examples of container hypervisors in accordance with the system described herein. Each of the container hypervisors 131, 132 may run as threads embedded within the storage system OS operating environment (the storage system OS 120). The container hypervisor 131 is shown running as a thread $t_0$ and may be running independently of the container hypervisor 132. The container hypervisor 132 is shown running two threads $t_1$ and $t_2$. These threads may run independently of each other as well as the thread $t_0$ of the container hypervisor 131. The independent operation of the threads $t_1$ and $t_2$ of the container hypervisor 132 is shown schematically with a dashed line. In each case, the threads $t_0$, $t_1$ and $t_2$ of the container hypervisors 131, 132 may run as threads of one or more instances of the storage system OS 120. For example, in an embodiment, the container hypervisors 131, 132 may be threads running as part of an Enginuity instance or a Linux instance. The container hypervisors 131, 132 may be scheduled like any other thread and may be preempted and interrupted as well as started and stopped. Advantageously, since the container hypervisors 131, 132 runs as threads within the storage system OS environment, physical resource sharing of the underlying hardware is already provided for according to the storage system OS scheduling.

A Guest OS 140 may be loaded using the thread $t_0$ of the container hypervisor-A 131 and, for example, may run an application in the virtual environment provided thereby. As shown, a Guest OS 151 may be loaded using independent threads $t_1$, $t_2$ of the container hypervisor 132. As further discussed elsewhere herein, threads $t_0$, $t_1$ and $t_2$ may all be run independently of each other. The ability to run a container hypervisor as a storage system OS thread provides that the storage system 100 may run with no performance penalty until the container hypervisor thread is enabled. Even when the hypervisor thread is enabled and running an application in a Guest OS, the performance impact may be controlled. Additionally, developments in physical hardware may be accommodated through a software development process that is decoupled from modifications to the hypervisor code. Accordingly, releases of new storage device code, hypervisor code and Guest OS, and applications code may all be realized in an independent manner.

In various embodiments, the container hypervisors 131, 132 may each provide for one or more of the following features: boot a Guest OS; run the Guest OS as a storage system OS thread (e.g., Symm/K); be scheduled, preemptable, etc.; reset the Guest OS without restarting the instance; allow the Guest OS to access storage devices (e.g., Symmetrix) using a Cut-through Device (CTD), as further discussed elsewhere herein; and allow the Guest OS to access the I/O Modules (IOMs) using a PCI pass-through device.

Figure 4:
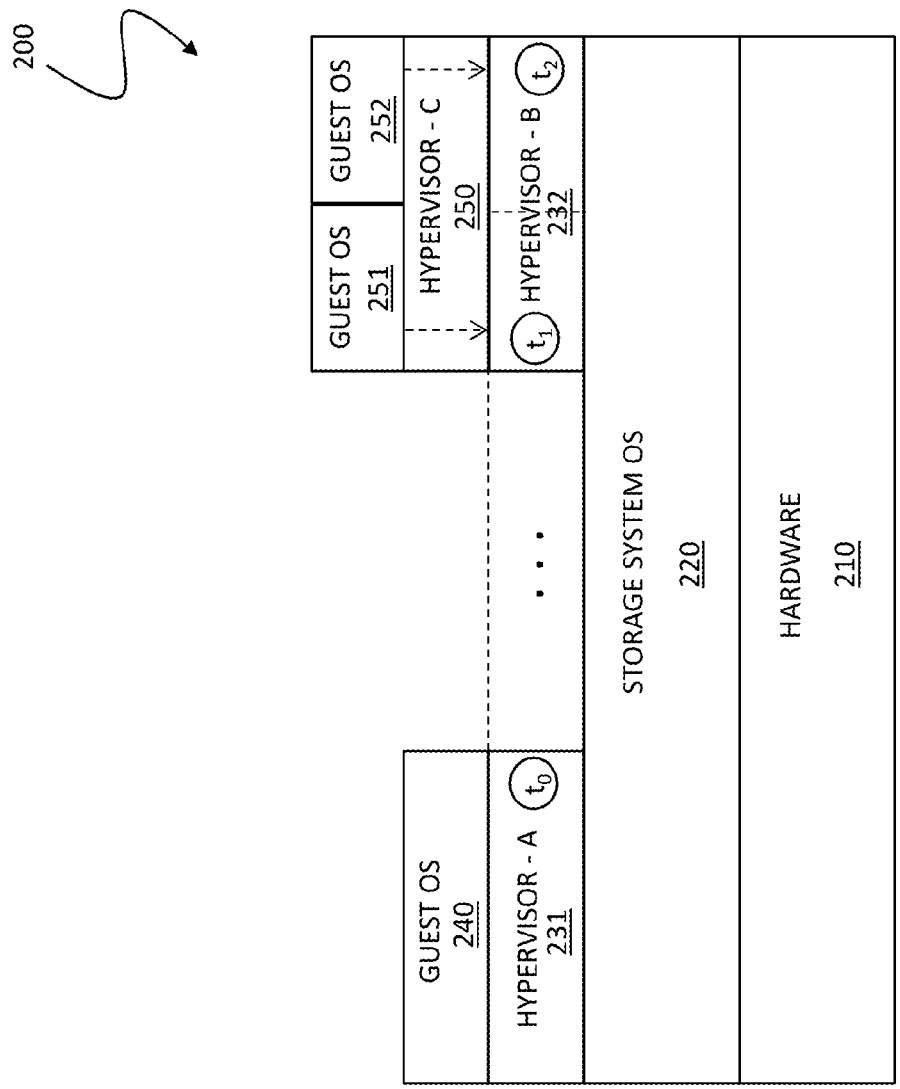
FIG. 4 is a schematic illustration showing a storage system with nested hypervisors that may be used in connection with another embodiment of the system described herein.

FIG. 4 is a schematic illustration showing a storage system 200 with nested hypervisors that may be used in connection with another embodiment of the system described herein. Like the storage system 100 previously discussed, the storage system 200 may include a hardware layer 210 and a storage system OS layer 220. A Guest OS 240 may be loaded using the thread $t_0$ of a container hypervisor (hypervisor-A) 231. As shown in connection with a container hypervisor (hypervisor-B) 232, the container hypervisor 232 may host one or more other hypervisors (hypervisor-C 250). In various embodiments, the hypervisor-C 250 may be another container hypervisor and/or may be another type of hypervisor, such as VMware's ESXi. The ability to host another hypervisor (hypervisor-C 250), as a nested hypervisor, provides the capability of the system 200 to host any guest operating system, such as Guest OSs 251, 252 (e.g., Linux) that may be hosted by the hypervisor 250 (e.g., ESXi) itself without needing to modify the code of the container hypervisor 232. It is noted that additional layers of hypervisors may further be nested in accordance with the system described herein. By embedding hypervisors within hypervisors in a storage system environment in the manner according to the system described herein, physical resource sharing may be provided using the storage system OS scheduling and, thereby, resource trampling that may occur with the addition of another hypervisor, without such system OS scheduling, is avoided.

Figure 5:
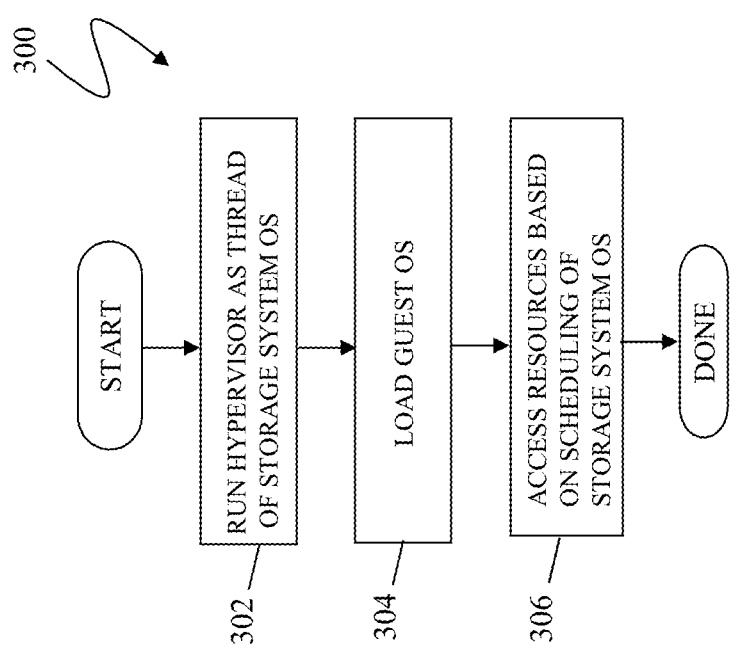
FIG. 5 is a flow diagram showing processing for operating a hypervisor and a guest operating system that may be used in connection with various embodiments of the system described herein.

FIG. 5 is a flow diagram 300 showing processing for operating a hypervisor and a Guest OS that may be used in connection with various embodiments of the system described herein. At a step 302, a container hypervisor is run as a thread of an underlying OS, for example, a storage system OS, such as Enginuity with Symm/K operating a Symmetrix storage system or the Linux operating system. After the step 302, processing proceeds to a step 304 where a Guest OS is loaded using the container hypervisor based on the thread of the storage system OS. The container hypervisor may be run independently of the Guest OS and independently of other hypervisors running as other threads of the storage system OS. After the step 304, processing proceeds to a step 306 where the hypervisor accesses resources according to a scheduler of the storage system OS and in connection with resource requirements of the Guest OS (and/or an application of the Guest OS). As further discussed elsewhere herein, the hypervisor may share resources with the other hypervisors according to the scheduling of the storage system OS. In an embodiment, the container hypervisor may be embedded with the storage system OS. As further discussed elsewhere herein, code of container hypervisor may be modified independently of code of the Guest OS and/or code of other hypervisors running as threads of the storage system OS. After the step 306, processing is complete. One or more of the above-noted processing steps may be implemented via executable code stored on a non-transitory computer readable medium and executable by at least one processor according to an embodiment of the system described herein.

Figure 6:
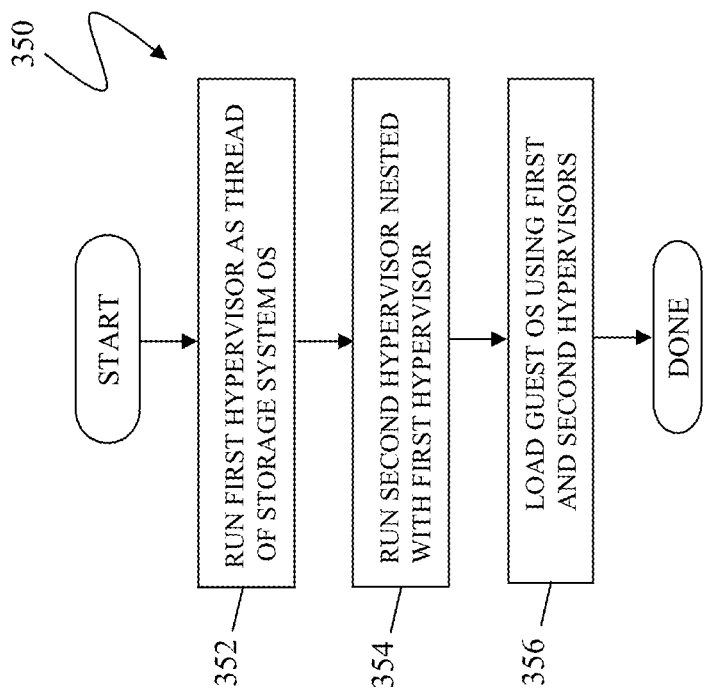
FIG. 6 is a flow diagram showing processing for operating nested hypervisors that may be used in connection with an embodiment of the system described herein.

FIG. 6 is a flow diagram 350 showing processing for operating nested hypervisors that may be used in connection with an embodiment of the system described herein. At a step 352, a container hypervisor (e.g., a first hypervisor) is run as a thread of an underlying OS, for example, a storage system OS, such as Enginuity with Symm/K operating a Symmetrix storage system. After the step 352, processing proceeds to a step 354, where a second hypervisor is run nested, and/or embedded within, the first hypervisor (the container hypervisor). In various embodiments, the second hypervisor may be a known hypervisor (e.g., ESXi) and/or may be another container hypervisor. Other hypervisors may be further nested in accordance with the system described herein. After the step 354, processing proceeds to a step 356, where a Guest OS is loaded using the first (container) hypervisor and the second hypervisor. After the step 356, processing is complete. One or more of the above-noted processing steps may be implemented via executable code stored on a non-transitory computer readable medium and executable by at least one processor according to an embodiment of the system described herein.

According to the system described herein, when the container hypervisor starts the Guest OS, the Guest OS may run in the context of the container hypervisor. The container hypervisor may access all of the Guest's memory while the Guest may only access the memory given to it by the container hypervisor. In order to avoid time-consuming calls that cause an exit from a VM (e.g., vmexit) as a result of certain Guest OS activities, virtual PCI devices may be used in connection with the container hypervisor. A virtual PCI device looks and behaves like normal PCI hardware to the Guest OS. Guest OS access to memory mapped I/O (MMIO) space does not necessarily cause a vmexit, depending on the virtual PCI device code of the container hypervisor. To allow I/O with the storage system (e.g., Symmetrix), a Cut-through Device (CTD) may be used that may be a virtual PCI device used in connection with the container hypervisor.

Figure 7:
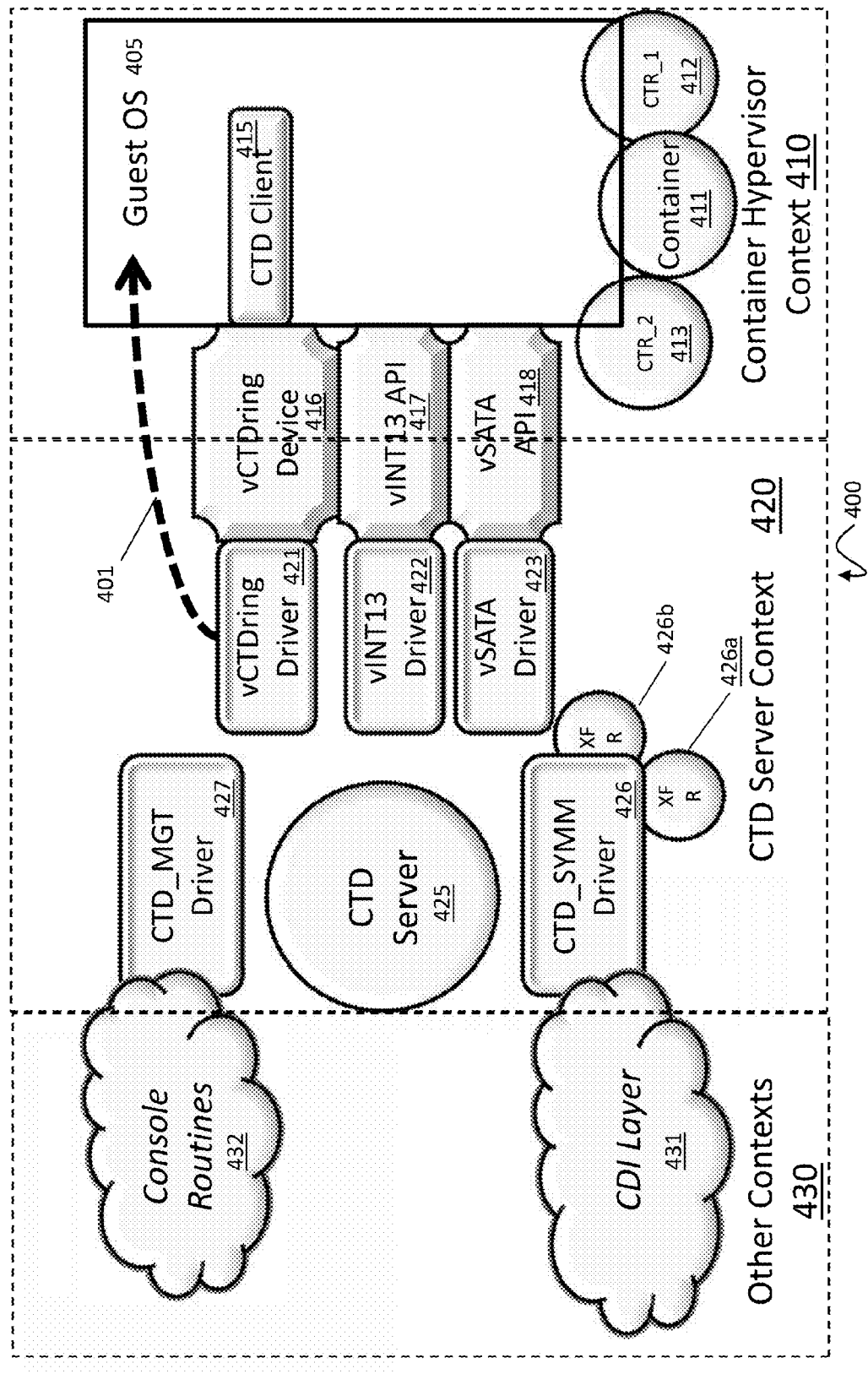
FIG. 7 is a schematic illustration of a cut-through-device subsystem used in connection with a container hypervisor that may be used in connection with an embodiment of the system described herein.

FIG. 7 is a schematic illustration of a CTD device subsystem 400 used in connection with a container hypervisor that may be used in connection with an embodiment of the system described herein. A protocol of the CTD device 400 may be built around small computer system interface (SCSI) control data blocks (CDBs). In an embodiment, the CTD device protocol may include data structures for scatter and gather of entry arrays, client requests and/or server completions. The CTD device 400 is shown operating in connection with container hypervisor context 410 that may include operation with one or more container hypervisor contexts 411-413. The CTD device 400 may use a particular driver (the CTD Client 415) in a Guest OS 405 loaded in connection with the container hypervisor. The CTD device 400 may have a further sub-system (the CTD Server 425) that runs in its own context (the CTD Server Context 420). There may be a virtual PCI device: vCTDring 416, and/or other application programming interfaces (APIs) used, such as vINT13 API 417 and vSATA API 418. Each device or API may have a driver (vCTDring Driver 421, vINT13 Driver 422, and vSATA driver 423) to interface therewith. The interaction of the vCTDring 416 of the CTD device 400 with the Guest OS 405 is shown schematically with arrow 401. In various embodiments, there may be separate threads to service each driver that runs in its own context. Other drivers, such as CTD_MGT Driver 426 (with associated components 426a, 426b) and CTD_SYMM Driver 427, may be included in connection with operation of the CTD Server for management and control in connection with other contexts 430, including a common device interface (CDI) layer 431 for the storage system and/or other console routines 432.

According to another embodiment, by using a thread of a container hypervisor in the storage system OS environment (e.g., Enginuity running Symm/K), it is possible for a Guest OS to operate in several modes. The container hypervisor thread may inherit the same number of CPU cores as that of the OS instance and may run as a single thread on those cores when active. However, since the container hypervisor is running as a thread, rather than being scheduled as an OS instance, as described elsewhere herein, other OS threads may also continue to run on other cores in the same SMP environment. The use of the OS scheduling algorithms (e.g., Symm/K) for scheduling the threads of the container hypervisors thus provide the ability to schedule fractions of CPU time on multiple cores for the Guest OSs. Furthermore, it is possible for the container hypervisor to allocate fewer virtual cores than physical cores available to the instance, and allow the Guest OS to operate SMP on those cores while still allowing other OS threads to operate with full CPU core resources, and to adjust the CPU allocation between Guest OSs and other threads. In an embodiment, in a VMAX system from EMC Corporation of Hopkinton, Mass., the granularity of the CPU time scheduling according to the system described herein may be on the order of 500 microseconds or less.

Figure 8:
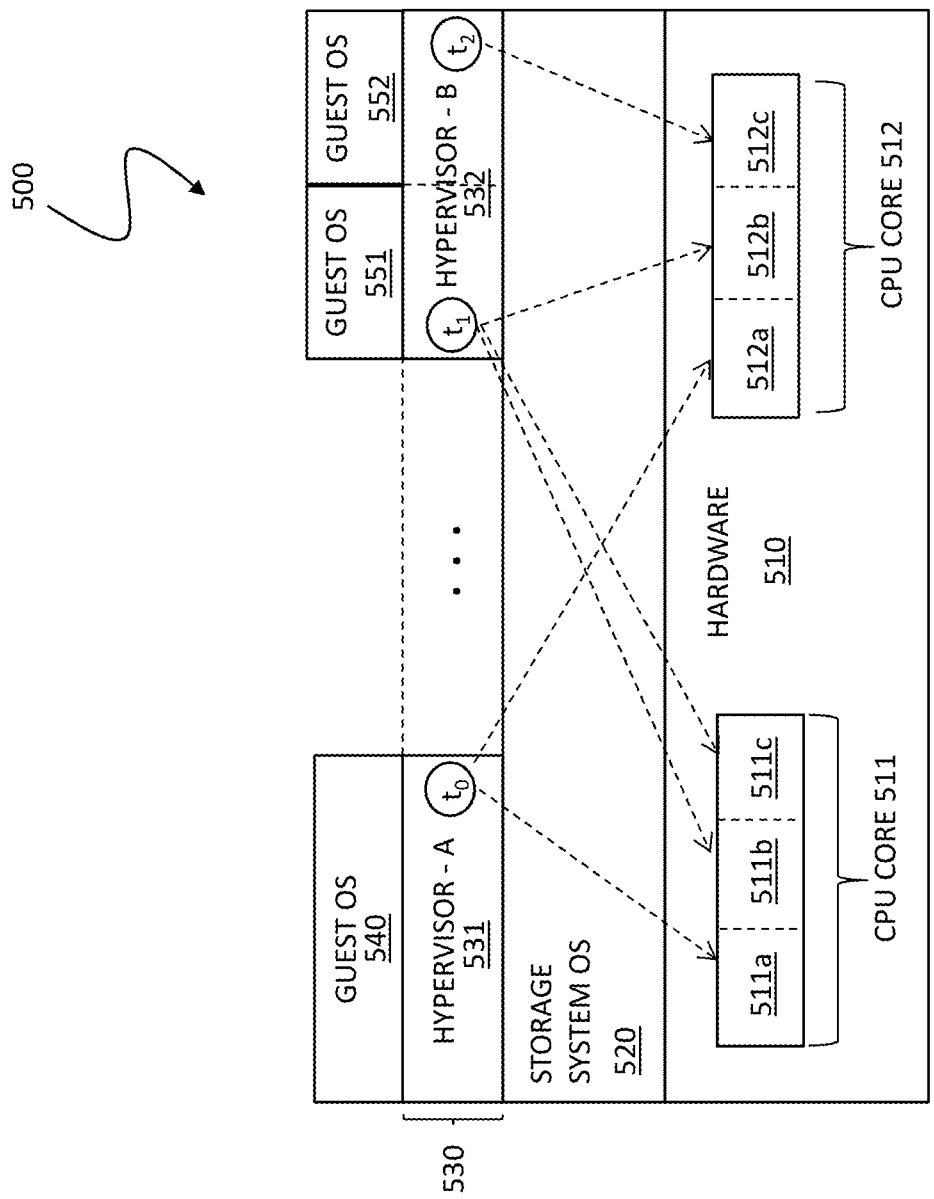
FIG. 8 is a schematic illustration showing a storage system with fractional SMP capabilities extended to one or more guest operating systems that may be used in connection with an embodiment of the system described herein.

FIG. 8 is a schematic illustration showing a storage system 500 with fractional SMP capabilities extended to one or more Guest OSs 540, 551, 552 that may be used in connection with an embodiment of the system described herein. The storage system 500 includes a hardware layer 510, a storage system OS layer 520 and a container hypervisor layer 530, with a container hypervisor 531 (hypervisor-A) and a container hypervisor 532 (hypervisor-B) illustrated by way of example. The Guest OSs 540, 551 and 552 may be loaded using the container hypervisors 531, 532. The container hypervisors 531, 532 map virtual CPU cores to the physical CPU cores 511, 512 of the hardware layer 510. That is, in accordance with the system described herein, the one or more Guest OSs may only have access to a different number of available CPU cores (virtual CPU cores) than are available as physical CPU cores on the hardware 510. Through the use of the container hypervisors 531, 532 running as storage system OS threads $t_0$, $t_1$, and $t_2$ (rather than being scheduled as storage system OS instances), the system described herein provides for the ability to schedule fractions of CPU time on multiple cores for one or more of the Guest OSs 540, 551, 552 according to the scheduling algorithms of the storage system OS components (e.g., Symm/K).

The scheduling of fractional CPU time on the physical CPU cores 511, 512 is shown schematically as fractions 511a-c and 512a-c of each of the CPU cores 511, 512. Each of the threads $t_0$, $t_1$, and $t_2$ of the container hypervisors 531, 532 may operate in an SMP regime on multiple ones of the cores 511, 512 while allowing others of the threads to also operate with full CPU core resources. The system described herein provides for flexible control of physical CPU allocation between Guest OSs 540, 551, 552 without causing one or more of the Guest OSs 540, 551, 552 to become inactive due to resource overlaps. In this way, the Guest OSs 540, 551, 552 may run based on the threads of the container hypervisors 531, 532 using varying amounts of CPU time per CPU core in an SMP regime. The system described herein may further provide for the use of global memories of the hardware layer 510, that may be accessed via the virtual CPUs mapped by the container hypervisors 531, 532 to the physical CPU cores 511, 512 to provide NVRAM capabilities, as further discussed elsewhere herein, for example, to provide one or more journaling devices.

Figure 9:
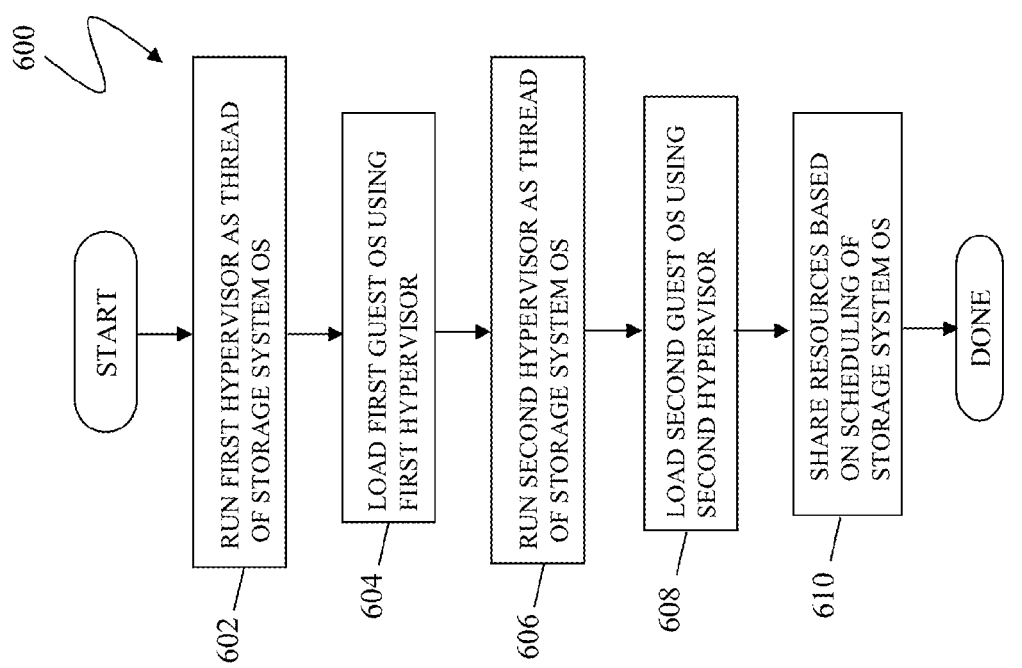
FIG. 9 is a flow diagram showing processes for fractional resource scheduling with multiple hypervisors that may be used in connection with an embodiment of the system described herein.

FIG. 9 is a flow diagram 600 showing processes for fractional resource scheduling with multiple hypervisors that may be used in connection with an embodiment of the system described herein. At a step 602, a first container hypervisor is run as a thread of an underlying OS, for example, a storage system OS, such as Enginuity with Symm/K operating a Symmetrix storage system. After the step 602, processing proceeds to a step 604 where a to first Guest OS is loaded using the first container hypervisor based on the thread of the storage system OS. After the step 604, processing proceeds to a step 606 where a second container hypervisor is run as a thread of the storage system OS. After the step 606, processing proceeds to a step 608 where a second Guest OS is loaded using the second container hypervisor based on the thread of the storage system OS. It is noted that, in various embodiments, the first and second container hypervisors may be run independently of each other and may be run independently of the first and second Guest OSs, such that modifications to code of each of the hypervisors may be done independently of each other, independently of modifications to the Guest OSs and/or independently of modifications to code of the storage system OS.

After the step 608, processing proceeds to a step 610 where the first and second container hypervisors may share resources according to fractional resource sharing scheduled by the scheduler (Symm/K) of the storage system OS and in connection with separate resource requirements of the first and second Guest OSs (and/or an application of the first and second Guest OSs). It is noted that, in various embodiments, the fractional resource scheduling depicted in illustration 600 may be implemented according to systems like that shown in FIGS. 3 and 4. After the step 610 processing is complete. One or more of the above-noted processing steps may be implemented via executable code stored on a non-transitory computer readable medium and executable by at least one processor according to an embodiment of the system described herein.

According to the system described herein, it has been found that, by using global memory features, such as features of the global memory 37 of one or more storage devices 24, 26 (e.g. EMC Symmetrix devices) (see, e.g., FIGS. 1 and 2), the global memory of the storage system may be advantageously used to provide NVRAM capabilities. The non-volatility of NVRAM (i.e. that retains its information when power is turned off) provides that an NVRAM device, provided using the global memory, may be used as a journaling device to track storage operations and facilitate recovery and/or failover processing in a storage system without needing to add additional hardware and/or other installed devices. Use of the global memory according to the system described herein to provide an NVRAM device functioning as a journaling device provides for the speeding up of transactions, thereby improving metadata intensive operations performance and reducing recovery time and/or failover time of a storage system. Additionally, by adding NVRAM capabilities using the global memory of the storage device(s), Guest OSs accessing the storage system are provided with an NVRAM device with journaling device capability without adding additional hardware support. Furthermore, according to the system described herein, NVRAM provided using the global memory may be accessed by multipath processing, enabling the channeling of NVRAM to different nodes without adding additional hardware support.

Figure 10:
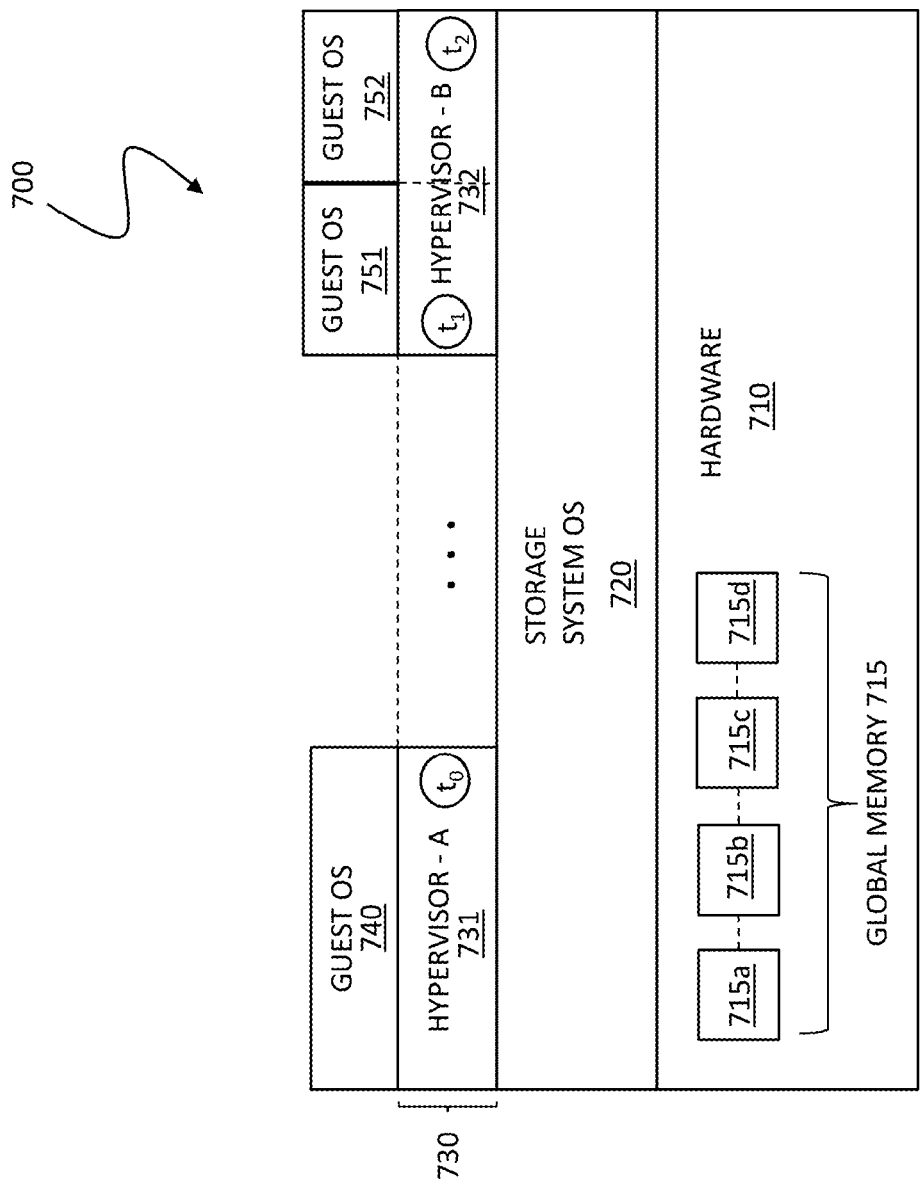
FIG. 10 is a schematic illustration showing a storage system in which NVRAM capability is added to the storage system using global memory of one or more storage devices of the hardware layer which is accessible by one or more Guest OSs accessing the storage system according to an embodiment of the system described herein.

FIG. 10 is a schematic illustration showing a storage system 700 in which NVRAM capability is added to the storage system using global memory 715 of one or more storage devices of the hardware layer 710 which is accessible by one or more Guest OSs 740, 751, 752 accessing the storage system 700 according to an embodiment of the system described herein. Similar to the storage systems discussed elsewhere herein, the storage system 700 includes the hardware layer 710, a storage system OS layer 720 and a container hypervisor layer 730, with a container hypervisor 731 (hypervisor-A) and a container hypervisor 732 (hypervisor-B) illustrated by way of example.

In an embodiment, the Guest OSs 740, 751 and 752 may be loaded using one or more of the container hypervisors 731, 732 via one or more of the threads t0, t1, t2, in a manner like that discussed in detail elsewhere herein. It is noted that, in other embodiments, other mechanisms may be used to load Guest OSs other than the use of container hypervisors, and the system described herein involving the use of global memory to provide NVRAM capabilities may similarly be used in connection with such other embodiments. The global memory 715 of the hardware layer 710 may be distributed across multiple storage devices, such as the memory 37 of the storage device 24 and, similarly, the storage device 26 in FIG. 1. The distributed nature of the global memory 715 is shown schematically by the illustration of memories 715$a$-$d$ forming the global memory 715. By using the global memory 715 of the storage system 700 to provide NVRAM capabilities to the Guest OSs 740, 751, 752 accessing the storage system 700, the system described herein provides Guest OSs with NVRAM capabilities without adding additional hardware support.

Figure 11:
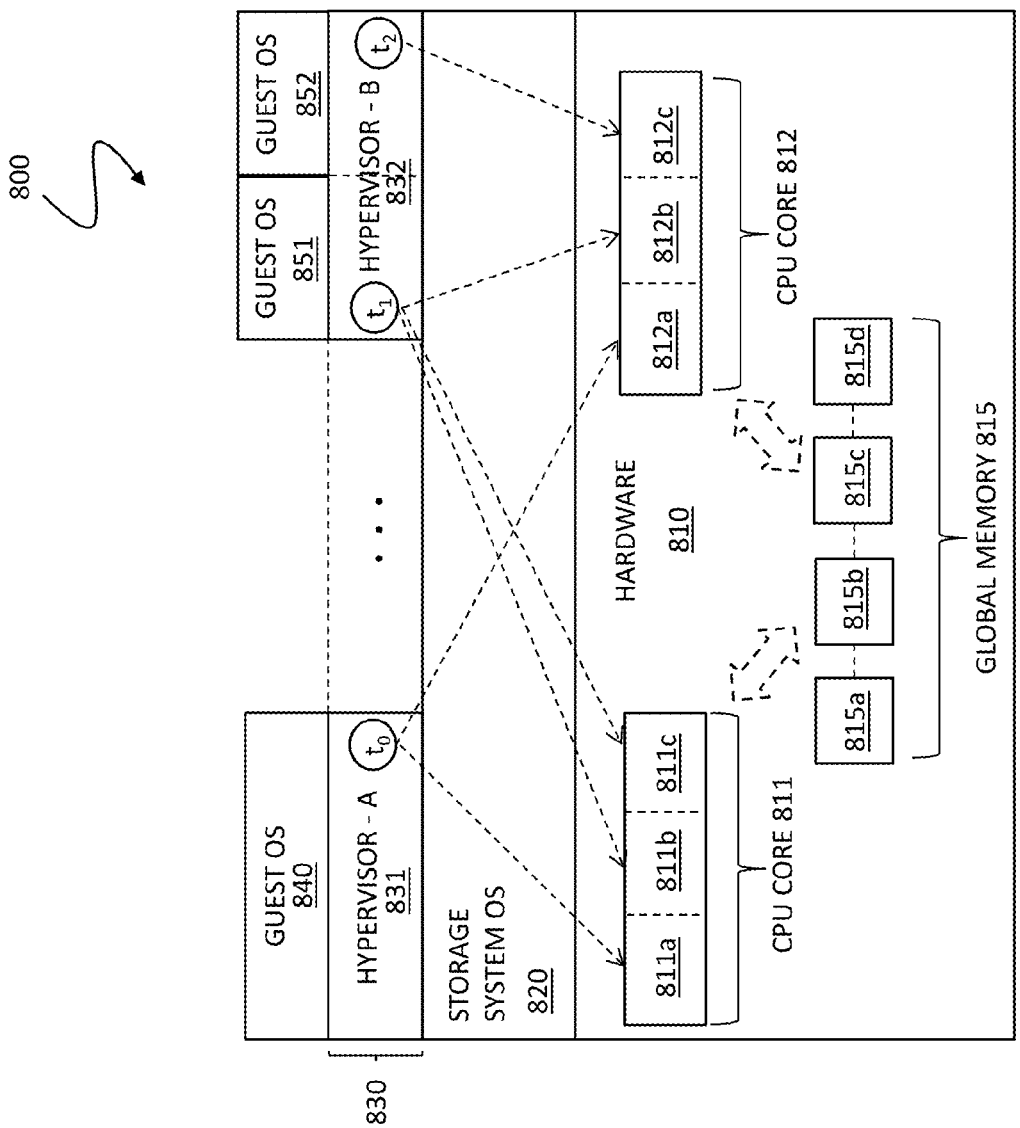
FIG. 11 is a schematic illustration showing a storage system in which the providing of NVRAM capability using a global memory in a hardware layer to enable journaling according to an embodiment of the system described herein.

FIG. 11 is a schematic illustration showing a storage system 800 in which the providing of NVRAM capability using a global memory 815 to enable journaling is schematically shown by CPU cores accessing the global memory 815 in a hardware layer 810 according to an embodiment of the system described herein. Similar to the storage system 700 discussed above, the storage system 800 may include the hardware layer 810, a storage system OS layer 820 and a container hypervisor layer 830, with a container hypervisor 831 to (hypervisor-A) and a container hypervisor 832 (hypervisor-B) illustrated by way of example.

In the illustrated example, the container hypervisors 831, 832 map virtual CPU cores to the physical CPU cores 811, 812 of the hardware layer 810. Through the use of the container hypervisors 831, 832 running as storage system OS threads $t_0$, $t_1$ and $t_2$, the system described herein provides for the ability to schedule processing (CPU) time on multiple cores for one or more of the Guest OSs 840, 851, 852 according to the scheduling algorithms of the storage system OS components (e.g., Symm/K). As further discussed elsewhere herein, the scheduling of processing time on the multiple cores may be on a fractional basis.

The scheduling of processing time on the physical CPU cores 811, 812 is shown schematically as fractional portions 811$a$-$c$ and 812$a$-$c$ of each of the CPU cores 811, 812. For example, each of the threads $t_0$, $t_1$, and $t_2$ of the container hypervisors 831, 832 may operate in an SMP regime on multiple ones of the cores 811, 812 while allowing others of the threads to also operate with full CPU core resources. The system described herein provides for flexible control of physical CPU allocation between Guest OSs 840, 851, 852 without causing one or more of the Guest OSs 840, 851, 852 to become inactive due to resource overlaps. In this way, the Guest OSs 840, 851, 852 may run based on the threads of the container hypervisors 831, 832 using varying amounts of CPU time per CPU core in an SMP regime.

The storage system 800 may provide for the use of a global memory 815 of the hardware layer 810, that may be accessed via the virtual CPUs mapped by the container hypervisors 831, 832 to the physical CPU cores 811, 812 to provide NVRAM capabilities that enables use of journaling to track and log storage operations and provide for failover and recovery processing in the storage system 800. The global memory 815 may be distributed across the multiple storage devices of the storage system 800 which is shown schematically by the global memory portions 815$a$-$d$. The Guest OSs 840, 851, 852 that are loaded onto the storage system 800 may be provided with NVRAM capabilities through the use of the global memory 815 and that, for example, enable the journaling functions. As illustrated, the CPU cores 811, 812 of the hardware layer 810 may control the writing and reading of journaling records and data to and from the global memory 815, as NVRAM, in connection with journaling functions being provided, independently, to each of the Guest OSs 840, 851, 852 that are loaded onto and accessing the storage system 800. The NVRAM provided by the global memory 815 may be access by multipathing techniques, as discussed elsewhere herein, in which more than one path may be provided between any one or more CPUs and the global memory providing NVRAM capabilities.

Figure 12:
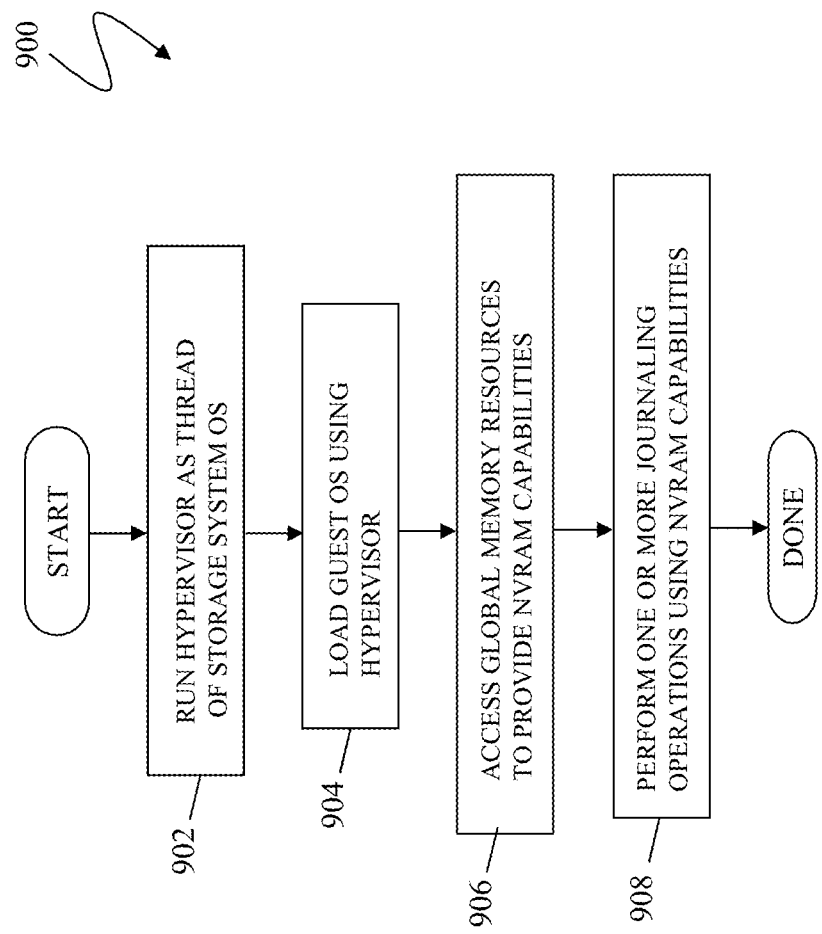
FIG. 12 is a flow diagram showing processing for providing NVRAM capabilities using global memory of a storage system and use thereof by a Guest OS as a journaling device according to an embodiment of the system described herein.

FIG. 12 is a flow diagram 900 showing processing for providing NVRAM capabilities using global memory of a storage system and use thereof by a Guest OS as a journaling device according to an embodiment of the system described herein. At a step 902, a container hypervisor is run as a thread of an underlying OS, for example, a storage system OS, such as Enginuity with Symm/K operating a Symmetrix storage system. After the step 902, processing proceeds to a step 904 where a Guest OS is loaded using the container hypervisor based on the thread of the storage system OS. As discussed elsewhere herein, the container hypervisor may be run independently of the Guest OS and independently of other hypervisors running as other threads of the storage system OS. After the step 904, processing proceeds to a step 906 where the hypervisor accesses resources according to a scheduler of the storage system OS and in connection with resource requirements of the Guest OS (and/or an application of the Guest OS).

In an embodiment according to the system described herein, the resources accessed in the step 906 in connection with the requirements of the Guest OS may include global memory provided by one or more distributed storage device memories of the storage system in which the global memory acts to provide NVRAM capabilities, as discussed in detail elsewhere herein. Further, processing resources may be used to provide journaling features in connection with the use of the global memory as NVRAM to thereby provide a journaling device that is used by the Guest OS in connection with the tracking and logging of storage operations that may be used to provide failover and/or recovery processing without adding additional hardware support for the Guest OS operations. Accordingly, after the step 906 processing proceeds to a step 908 where one or more journaling operations, and/or other appropriate operations, are performed using the NVRAM capabilities provided by the use of the global memory according to the system described herein. In various embodiments, journaling operations may include allocating storage space for journal entries concerning storage operations and processes, writing and/or time stamping of journal entries, controlling mapping operations with respect to the mapping of journal data to storage space and/or reading of journal entries in connection with recovery and failover processes, among other possible journaling operations. After the step 908, processing is complete. One or more of the above-noted processing steps may be implemented via executable code stored on a non-transitory computer readable medium and executable by at least one processor according to an embodiment of the system described herein.

Various embodiments discussed herein may be combined with each other in appropriate combinations in connection with the system described herein. Additionally, in some instances, the order of steps in the flowcharts, flow diagrams and/or described flow processing may be modified, where appropriate. Further, various aspects of the system described herein may be implemented using software, hardware, a combination of software and hardware and/or other computer-implemented modules or devices having the described features and performing the described functions. Software implementations of the system described herein may include executable code that is stored in a computer readable medium and executed by one or more processors. The computer readable medium may include non-volatile and/or volatile memory, and examples may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method for using global memory of a distributed system to provide non-volatile memory random access memory (NVRAM) capabilities, comprising:

identifying the global memory of the distributed system, wherein the distributed system is a distributed storage system having a plurality of storage devices located remotely from each other that each includes a portion of the global memory and a data storage component for storing data and each being operated using a storage system operating system of the distributed storage system, wherein scheduling algorithms of the storage system operating system control access to underlying hardware resources of the storage system, and wherein the global memory contains tasks that are to be performed by the storage devices and includes a cache for data fetched from one or more of the data storage components of the storage devices;

providing access by a guest operating system to the global memory, wherein the guest operating system is different from the storage system operating system of the distributed storage system, and wherein the guest operating system runs on a virtual environment controlled using the storage system operating system;

providing access by a second guest operating system to the global memory, wherein the second guest operating system is different from the first guest operating system and the storage system operating system of the distributed storage system;

using the global memory accessed by the first guest operating system and the second guest operating system as NVRAM; and performing journaling operations of the first guest operating system and the second guest operating system using the NVRAM provided by the global memory, wherein the journaling operations are provided independently to each of the first and the second guest operating systems and provide journaling device capability to each of the first and the second guest operating system via the NVRAM provided by the global memory without use of an additional journaling device by either of the first guest operating system or the second guest operating system.

2. The method according to claim 1, wherein the journaling operations include recovery or failover processing.

3. The method according to claim 1, wherein providing access by the guest operating system to the global memory includes loading the guest operating system using a hypervisor, the hypervisor being a thread of the storage system operating system that manages the virtual environment and controls access of the guest operating system to the distributed storage system.

4. The method according to claim 1, wherein processing resources accessing the global memory acting as NVRAM are distributed across the plurality of storage devices.

5. A non-transitory computer readable medium storing software for using global memory of a distributed system to provide non-volatile memory random access memory (NVRAM) capabilities, the software comprising:

executable code that identifies the global memory of the distributed system, wherein the distributed system is a distributed storage system having a plurality of storage devices located remotely from each other that each includes a portion of the global memory and a data storage component for storing data and each being operated using a storage system operating system of the distributed storage system, wherein scheduling algorithms of the storage system operating system control access to underlying hardware resources of the storage system, and wherein the global memory contains tasks that are to be performed by the storage devices and includes a cache for data fetched from one or more of the data storage components of the storage devices;

executable code that provides access by a guest operating system to the global memory, wherein the guest operating system is different from the storage system operating system of the distributed storage system, and wherein the guest operating system runs on a virtual environment controlled using the storage system operating system;

executable code that provides access by a second guest operating system to the global memory, wherein the second guest operating system is different from the first guest operating system and the storage system operating system of the distributed storage system;

executable code that uses the global memory accessed by the first guest operating system and the second guest operating system as NVRAM; and executable code that performs journaling operations of the first guest operating system and the second guest operating system using the NVRAM provided by the global memory, wherein the journaling operations are provided independently to each of the first and the second guest operating systems and provide journaling device capability to each of the first and the second guest operating system via the NVRAM provided by the global memory without use of an additional journaling device by either of the first guest operating system or the second guest operating system.

6. The non-transitory computer readable medium according to claim 5, wherein the journaling operations include recovery or failover processing.

7. The non-transitory computer readable medium according to claim 5, wherein the executable code that provides access by the guest operating system to the global memory includes executable code that loads the guest operating system using a hypervisor, the hypervisor being a thread of the storage system operating system that manages the virtual environment and controls access of the guest operating system to the distributed storage system.

8. The non-transitory computer readable medium according to claim 5, wherein processing resources accessing the global memory acting as NVRAM are distributed across the plurality of storage devices.

9. A distributed storage system having global memory used to provide non-volatile memory random access memory (NVRAM) capabilities, comprising:

at least one processor providing processing resources for the distributed storage system;

a computer-readable medium storing software executable by the at least one processor, the software including:

executable code that identifies the global memory of the distributed storage system, wherein the distributed system is a distributed storage system having a plurality of storage devices located remotely from each other that each includes a portion of the global memory and a data storage component for storing data and each being operated using a storage system operating system of the distributed storage system, wherein scheduling algorithms of the storage system operating system control access to underlying hardware resources of the storage system, and wherein the global memory contains tasks that are to be performed by the storage devices and includes a cache for data fetched from one or more of the data storage components of the storage devices;

executable code that provides access by a guest operating system to the global memory, wherein the guest operating system is different from the storage system operating system of the distributed storage system, and wherein the guest operating system runs on a virtual environment controlled using the storage system operating system;

executable code that provides access by a second guest operating system to the global memory, wherein the second guest operating system is different from the first guest operating system and the storage system operating system of the distributed storage system;

executable code that uses the global memory accessed by the first guest operating system and the second guest operating system as NVRAM; and executable code that performs journaling operations of the first guest operating system and the second guest operating system using the NVRAM provided by the global memory, wherein the journaling operations are provided independently to each of the first and the second guest operating systems and provide journaling device capability to each of the first and the second guest operating system via the NVRAM provided by the global memory without use of an additional journaling device by either of the first guest operating system or the second guest operating system.

10. The distributed storage system according to claim 9, wherein the journaling operations include recovery or failover processing.

11. The distributed storage system according to claim 9, wherein the executable code that provides access by the guest operating system to the global memory includes executable code that loads the guest operating system using a hypervisor, the hypervisor being a thread of the storage system operating system that manages the virtual environment and controls access of the guest operating system to the distributed storage system.

12. The distributed storage system according to claim 9, wherein processing resources accessing the global memory acting as NVRAM are distributed across the plurality of storage devices.

13. The distributed storage system according to claim 9, wherein the virtual environment is a first virtual environment, and wherein the second guest operating system runs on a second virtual environment controlled using the storage system operating system.

14. The distributed storage system according to claim 13, wherein the scheduling algorithms of the storage system operating system control access to the underlying hardware resources of the storage system by the first guest operating system and the second guest operating system.

15. The non-transitory computer readable medium according to claim 5, wherein the virtual environment is a first virtual environment, and wherein the second guest operating system runs on a second virtual environment controlled using the storage system operating system.

16. The non-transitory computer readable medium according to claim 15, wherein the scheduling algorithms of the storage system operating system control access to the underlying hardware resources of the storage system by the first guest operating system and the second guest operating system.

17. The method according to claim 1, wherein the virtual environment is a first virtual environment, and wherein the second guest operating system runs on a second virtual environment controlled using the storage system operating system.

18. The method according to claim 17, wherein the scheduling algorithms of the storage system operating system control access to the underlying hardware resources of the storage system by the first guest operating system and the second guest operating system.

* * * * *